United States Patent
Faieta et al.

(10) Patent No.: US 12,093,308 B2
(45) Date of Patent: Sep. 17, 2024

(54) EMBEDDING-BASED COLOR-OBJECT RETRIEVAL

(71) Applicant: ADOBE INC., San Jose, CA (US)

(72) Inventors: Baldo Faieta, San Francisco, CA (US); Ajinkya Gorakhnath Kale, San Jose, CA (US); Pranav Vineet Aggarwal, Santa Clara, CA (US); Naveen Marri, Fremont, CA (US); Saeid Motiian, San Francisco, CA (US); Tracy Holloway King, Mountain View, CA (US); Alex Filipkowski, San Francisco, CA (US); Shabnam Ghadar, Menlo Park, CA (US)

(73) Assignee: ADOBE INC., San Jose, CA (US)

( * ) Notice: Subject to any disclaimer, the term of this patent is extended or adjusted under 35 U.S.C. 154(b) by 289 days.

(21) Appl. No.: 17/453,595

(22) Filed: Nov. 4, 2021

(65) Prior Publication Data

US 2023/0137774 A1 May 4, 2023

(51) Int. Cl.
*G06F 16/583* (2019.01)
*G06F 16/535* (2019.01)
(Continued)

(52) U.S. Cl.
CPC ........ *G06F 16/5838* (2019.01); *G06F 16/535* (2019.01); *G06F 16/538* (2019.01);
(Continued)

(58) Field of Classification Search
CPC .. G06F 16/5838; G06F 16/535; G06F 16/538; G06F 16/5866; G06F 40/295;
(Continued)

(56) References Cited

U.S. PATENT DOCUMENTS 10,713,821 B1 * 7/2020 Surya .................... G06N 3/045
11,615,567 B2 3/2023 Harikumar et al.
(Continued)

FOREIGN PATENT DOCUMENTS

| CN | 106560809 A | 4/2017 |
|----|-------------|--------|
| CN | 106560810 A | 4/2017 |
| CN | 106980868 A | 7/2017 |

OTHER PUBLICATIONS

Office Action dated Sep. 22, 2022 in related U.S. Appl. No. 17/186,625.

(Continued)

*Primary Examiner* — Angelica Ruiz
(74) *Attorney, Agent, or Firm* — F. CHAU & ASSOCIATES, LLC

(57) ABSTRACT

Systems and methods for image retrieval are described. Embodiments of the present disclosure receive a search query from a user; extract an entity and a color phrase describing the entity from the search query; generate an entity color embedding in a color embedding space from the color phrase using a multi-modal color encoder; identify an image in a database based on metadata for the image including an object label corresponding to the extracted entity and an object color embedding in the color embedding space corresponding to the object label; and provide image information for the image to the user based on the metadata.

20 Claims, 12 Drawing Sheets

(51) Int. Cl.
    *G06F 16/538*     (2019.01)
    *G06F 16/58*     (2019.01)
    *G06F 40/295*     (2020.01)
    *G06N 3/08*     (2023.01)

(52) U.S. Cl.
    CPC ........ *G06F 16/5866* (2019.01); *G06F 40/295* (2020.01); *G06N 3/08* (2013.01)

(58) Field of Classification Search
    CPC ..... G06F 16/5854; G06F 40/279; G06N 3/08; G06N 3/045
    See application file for complete search history.

(56) References Cited

U.S. PATENT DOCUMENTS

| | | | |
|---|---|---|---|
| 2007/0217654 | A1* | 9/2007 | Rao |
| 2012/0092359 | A1 | 4/2012 | O'Brien-Strain et al. |
| 2015/0104183 | A1 | 4/2015 | Cesnik |
| 2015/0324392 | A1 | 11/2015 | Becker et al. |
| 2016/0140519 | A1 | 5/2016 | Trepca et al. |
| 2017/0220903 | A1 | 8/2017 | Hertzmann et al. |
| 2019/0258671 | A1* | 8/2019 | Bou ................ G06F 16/7867 |
| 2019/0294641 | A1 | 9/2019 | Alexeev et al. |
| 2020/0342328 | A1* | 10/2020 | Revaud ................ G06F 18/22 |
| 2020/0380027 | A1 | 12/2020 | Aggarwal et al. |
| 2020/0380298 | A1 | 12/2020 | Aggarwal et al. |
| 2020/0380403 | A1 | 12/2020 | Aggarwal et al. |
| 2021/0004589 | A1* | 1/2021 | Turkelson ........ G06V 30/19173 |
| 2021/0089827 | A1 | 3/2021 | Kumagai et al. |
| 2021/0103969 | A1* | 4/2021 | Sollami .............. G06Q 30/0625 |
| 2021/0383067 | A1* | 12/2021 | Reisswig .............. G06F 40/295 |
| 2022/0108169 | A1* | 4/2022 | Saha ...................... G06N 3/088 |

OTHER PUBLICATIONS

Related to U.S. Appl. No. 16/561,973, filed Sep. 5, 2019, entitled: Multi-Resolution Color-Based Image Search.
Related to U.S. Appl. No. 17/075,450, filed Oct. 20, 2020, entitled: Generating Embeddings In A Multimodal Embedding Space For Cross-Lingual Digital Image Retrieval.
Related to U.S. Appl. No. 16/426,298, filed May 30, 2019, entitled: Visually Guided Machine-Learning Language Model.
Related to U.S. Appl. No. 16/426,264, filed May 30, 2019, entitled: Text-to-Visual Machine Learning Embedding Techniques.
Related to U.S. Appl. No. 16/426,369, filed May 30, 2019, entitled: Multi-Modal Differential Search with Real-Time Focus Adaptation.
Related to U.S. Appl. No. 17/186,625, filed Feb. 26, 2021, entitled: Text To Color Palette Generator.
2Adobe Stock, Found on the internet, https://stock.adobe.com/.
1universal-sentence-encoder-multilingual-large, Found on the internet, https://tfhub.dev/google/universal-sentence-encoder-multilingual-large/3.
Related to U.S. Appl. No. 17/240,030, filed Apr. 26, 2021, entitled: Multi-Modal Image Color Segmenter and Editor.
Related to U.S. Appl. No. 15/913,829, filed Mar. 6, 2018 entitled: Semantic Class Localization Digital Environment.
Notice of Allowance dated May 23, 2023, in corresponding U.S. Appl. No. 17/240,030.
Office Action dated May 30, 2023 in corresponding U.S. Appl. No. 17/186,625.
Final Office Action issued on Aug. 23, 2023 in corresponding U.S. Appl. No. 17/186,625.
Office Action dated Jun. 26, 2024 in corresponding Chinese Patent Application Serial No. 201910034225.1 (5 pages), in Chinese.

\* cited by examiner

EMBEDDING-BASED COLOR-OBJECT RETRIEVAL

BACKGROUND

The following relates generally to image processing, and more specifically to image retrieval using machine learning.

Image processing refers to the use of a computer to edit a digital image using an algorithm or a processing network. Image retrieval refers to the task of extracting image resources based on a query. In some cases, image retrieval includes identifying relevant search objects from a database and comparing the search objects to a query object. For example, a user may provide a text description of an image as a query, and a search engine may find images that are similar or relevant to the query.

In some cases, image retrieval systems represent query objects and search objects as multi-dimensional vectors in an embedding space. The vector representations can capture the semantic meaning and other attributes such as color information, meta-data or classification tags. An image retrieval system such as a search engine can retrieve relevant documents by comparing the embedded representation of the query to the embedded representations of the documents stored in a database (i.e., the search objects). Recently, image retrieval systems have used neural networks and other sophisticated embedding systems to generate complex, high dimensional embeddings that are capable of comparing and differentiating a large number of different text or image objects.

However, conventional image retrieval systems are not able to handle scenarios where there are multiple object-color pairs, or where a color phrase is similar to an object name such as "salmon pink". Since the number of these exceptions is potentially very high, addressing them individually can be costly and inefficient. Therefore, there is a need in the art for improved image retrieval systems that are capable of handling complex user queries efficiently.

SUMMARY

The present disclosure describes systems and methods for image retrieval. Embodiments of the disclosure provide an image retrieval network trained using machine learning to embed object labels of candidate images and query color phrases in a same embedding space that enables efficient search. In some embodiments, a color name entity recognition (NER) network is configured to identify a color phrase describing an entity. A query dependency parser (QDP) processes a search query to determine a relationship between the entity and the color phrase, especially when the search query has multiple object-color pairs.

A method, apparatus, and non-transitory computer readable medium for image retrieval are described. One or more embodiments of the method, apparatus, and non-transitory computer readable medium include receiving a search query from a user; extracting an entity and a color phrase describing the entity from the search query; generating an entity color embedding in a color embedding space from the color phrase using a multi-modal color encoder; identifying an image in a database based on metadata for the image including an object label corresponding to the extracted entity and an object color embedding in the color embedding space corresponding to the object label; and providing image information for the image to the user based on the metadata.

A method, apparatus, and non-transitory computer readable medium for training a neural network are described. One or more embodiments of the method, apparatus, and non-transitory computer readable medium include receiving training data comprising a set of training color phrases and a corresponding set of color images; training a multi-modal color encoder based on the training data using contrastive learning; generating an object color embedding for an object in an image using the multi-modal color encoder; generating an entity color embedding for a color phrase describing an entity in a search query using the multi-modal color encoder; determining that the entity color embedding is within a threshold distance of the object color embedding in a color embedding space; and selecting the image based on the determination.

An apparatus and method for image retrieval are described. One or more embodiments of the apparatus and method include a labeling component configured to generate an object label for an object in an image; a multi-modal color encoder configured to generate an entity color embedding for a color phrase describing an entity in a search query, and to generate an object color embedding for the object based on an object mask; and a search component configured to match the entity in the search query to the object in the image, and to determine that the entity color embedding is similar to the object color embedding.

DETAILED DESCRIPTION

Figure 1:
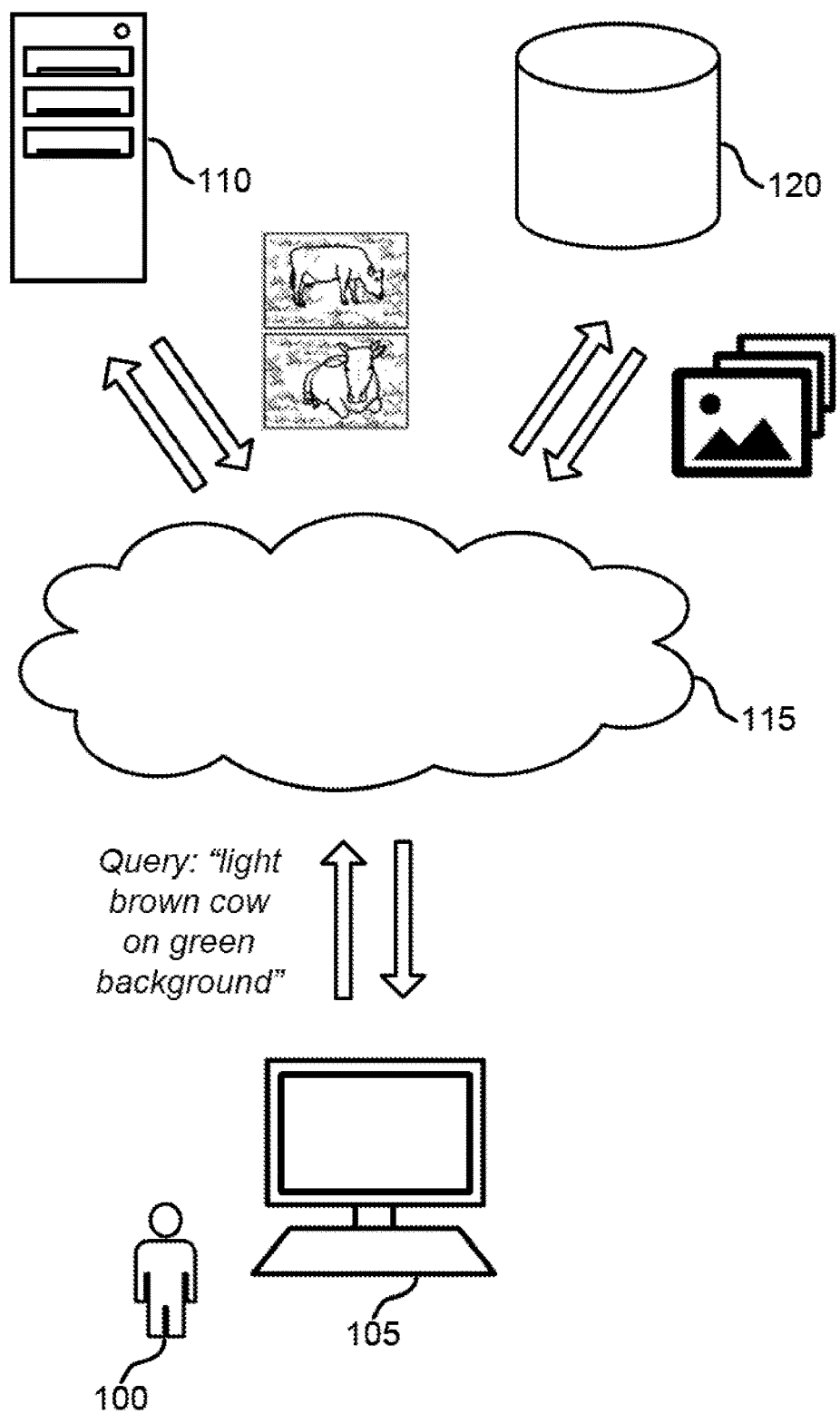
FIG. 1 shows an example of an image retrieval system according to aspects of the present disclosure.

The present disclosure describes systems and methods for image retrieval. Embodiments of the disclosure provide an image retrieval network trained using machine learning to embed object labels of candidate images and query color phrases in the same color embedding space to enable efficient search based on color phrases. A color name entity recognition (NER) network can be configured to process a search query to identify a color phrase describing an entity. A query dependency parser (QDP) can then process the search query to determine a relationship between the entity and the color phrase, especially when the search query has multiple object-color pairs.

In some embodiments, a multi-modal color encoder is trained to generate an entity color embedding for a color phrase describing an entity in a search query and generate an object color embedding for the object based on an object mask. In some examples, the multi-modal color encoder may be trained using contrastive learning.

Recently, image retrieval based on a user search query has been performed by associating tags or a group of words to images stored in a database. However, the tags do not include associations between specific objects and colors of the objects. For example, when searching for "a white rose on a red background", a conventional image retrieval system may retrieve images with red roses on white background because the image metadata that forms the basis of the search does not connect colors to objects. Additionally, conventional systems are incapable of handling ambiguous search phrases such as "salmon pink," "wine red," "bluish green," etc. For example, when searching for "salmon pink dress", conventional systems might interpret "salmon" as an object rather than as a color and retrieve images related to a plate of salmon.

One or more embodiments of the present disclosure include an image retrieval apparatus that can recognize color phrases of a search query and embed them in a color embedding space. Similarly, metadata can be generated for images to be searched that includes an association between specific objects within an image and the colors of those objects, even if there are multiple objects of different colors in an image. A multi-modal color encoder is trained to generate an object color embedding for an object in an image as well as an entity color embedding for a color phrase describing an entity in a search query.

By identifying object-color relationships in a search query and converting a color phrase into a same color embedding space as the labels corresponding to specific objects of the candidate images, one or more embodiments of the present disclosure provide an image retrieval network that can perform efficient image search on a large number of images for image retrieval. In some aspects, a query dependency parser processes the search query to determine a relationship between the entity and the color phrase (i.e., which entity a color phrase is referring to in a search query). A color named entity recognition network can process a search query to identify the color phrase describing the entity.

The improved network is scalable to scenarios where color phrases overlap object names such as "coral red", "olive green", "salmon pink", etc. Note coral, olive and salmon are objects but should be regarded as a part of a color phrase. The improved network can detect such color phrases. Additionally, the image retrieval network removes the dependency on pre-specified color words in the tag vocabulary such that a search engine can search for objects and background with non-frequent colors. The image retrieval apparatus can be trained to search through millions of images efficiently and can handle color variations or new color phrases such as bluish green, mauve, etc.

Embodiments of the present disclosure may be used in the context of a search engine. For example, an image retrieval network based on the present disclosure may take natural language text as a query, and efficiently search through millions of images to find images relevant to the search query. An example application of the inventive concept in the image search context is provided with reference to FIGS. 1-3. Details regarding the architecture of an example image retrieval apparatus are provided with reference to FIGS. 4-5. An example of a process for image retrieval are provided with reference to FIGS. 6-11. A description of an example training process is described with reference to FIG. 12.

Image Search Application

FIG. 1 shows an example of an image retrieval system according to aspects of the present disclosure. The example shown includes user 100, user device 105, image retrieval apparatus 110, cloud 115, and database 120. Image retrieval apparatus 110 is an example of, or includes aspects of, the corresponding element described with reference to FIG. 4.

In the example of FIG. 1, the user 100 searches for a "light brown cow on green background". In some examples, the search query is a natural language query. Search objects (i.e., candidate images) may be stored in a database of an image search engine (e.g., database 120). The user 100 communicates with the image retrieval apparatus 110 via the user device 105 and the cloud 115. The user device 105 transmits the search query to the image retrieval apparatus 110 to find related objects or information (i.e., search objects stored within the database 120).

The search query includes one or more object-color pairs. An object in a search query may also be referred to as an entity. A color name entity recognition (NER) network of the image retrieval apparatus 110 may be configured to process the search query to identify the color phrase describing the entity. According to an embodiment, a multi-modal color encoder generates an entity color embedding for a color phrase describing an entity in a search query.

The user device 105 may be a personal computer, laptop computer, mainframe computer, palmtop computer, personal assistant, mobile device, or any other suitable processing apparatus. In some examples, the user device 105 includes software that incorporates an image search application (e.g., an image search engine). The image search application may either include or communicate with the image retrieval apparatus 110.

A user interface may enable a user 100 to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

The image retrieval apparatus 110 extracts an entity and a color phrase describing the entity from the search query. A multi-modal color encoder of the image retrieval apparatus 110 generates an entity color embedding in a color embedding space from the color phrase. The database 120 identifies (via a search component of the image retrieval apparatus 110) and returns an image based on metadata for the image including an object label corresponding to the extracted entity and an object color embedding in the color embedding space corresponding to the object label. The matching images are presented to the user 100. The process of using the retrieval apparatus 110 to perform image search is further described with reference to FIG. 2.

Prior to performing the search (i.e., offline stage), the image retrieval apparatus 110 may be trained and then used to embed the color of one or more search objects (e.g., images or image assets) in a color embedding space in which each of the objects corresponds to an object color embedding. During query search (i.e., online stage), the query color phrase is mapped to a corresponding entity color embedding using text-to-color embedding method. Next, the entity color embedding is compared to color embedding of each search object stored in the database 120. The entity color embedding and object color embeddings that are within a certain distance of each other are considered a match.

The image retrieval apparatus 110 includes a computer implemented network comprising a labeling component, a multi-modal color encoder, a search component, a segmentation mask component, an auto-tagger, a color name entity recognition (NER) network, and a query dependency parser (QDP). The image retrieval apparatus 110 receives a search query from a user; extracts an entity and a color phrase describing the entity from the search query; generates an entity color embedding in a color embedding space from the color phrase using a multi-modal color encoder; identifies an image in a database based on metadata for the image including an object label corresponding to the extracted entity and an object color embedding in the color embedding space corresponding to the object label; and provides image information for the image to the user based on the metadata.

The image retrieval apparatus 110 may also include a processor unit, a memory unit, an I/O module, and a training component. The training component is used to train a machine learning model (or an image retrieval network). Additionally, the image retrieval apparatus 110 can communicate with the database 120 via the cloud 115. In some cases, the architecture of the image retrieval network is also referred to as a network model. Further detail regarding the architecture of the image retrieval apparatus 110 is provided with reference to FIGS. 4 and 5. Further detail regarding the operation of the image retrieval apparatus 110 is provided with reference to FIGS. 6-11.

In some cases, the image retrieval apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud 115 is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, a database 120 can store candidate images and metadata for the images (e.g., object-color associations) in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction. According to some examples, database 120 includes a set of images indexed for image search, wherein each of the plurality of images comprises image metadata including labels and color embedding information corresponding to the labels. Database 120 is an example of, or includes aspects of, the corresponding element described with reference to FIGS. 5, 7, and 8.

Figure 2:
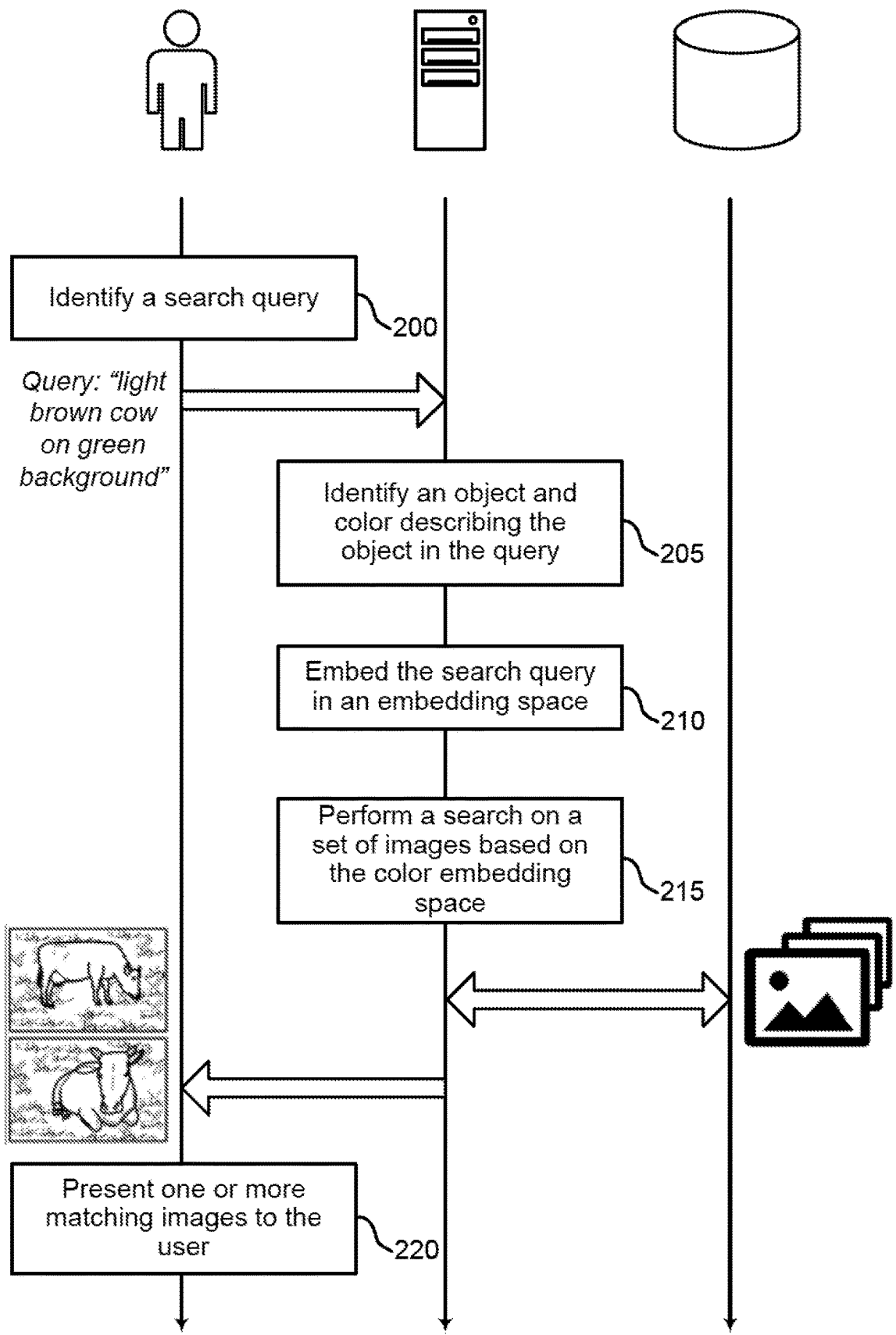
FIG. 2 shows an example of image retrieval according to aspects of the present disclosure.

FIG. 2 shows an example of image retrieval according to aspects of the present disclosure. The image retrieval apparatus can be used in an image search application to perform image search based on user query. In some examples, a user is interested in retrieving relevant and accurate images based on a search query. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the system identifies a search query. In some cases, the operations of this step refer to, or may be performed by, a user as described with reference to FIG. 1. As an example illustrated in FIG. 2, a search query is "light brown cow on green background". In some examples, a search query includes multiple color-object pairs, complicated or ambiguous color phrases (e.g., "salmon pink"), colors that are exclusively associated with certain object, and color modifiers (e.g., "pale green").

At operation 205, the system identifies an object and color describing the object in the query. In some cases, the operations of this step refer to, or may be performed by, an image retrieval apparatus as described with reference to FIGS. 1 and 4. The system can extract an entity from the search query and a color phrase describing the entity. In the example above, the system identifies color phrase "light brown" describing entity "cow". The system also identifies color phrase "green" describing entity "background". A color phrase may be one word or may have multiple wordpieces or words.

At operation 210, the system embeds the search query in an embedding space. In some cases, more than one vector representation can be generated for a search query. For example, the query (or portions of it) can be embedded in a color-specific embedding space. In some cases, the operations of this step refer to, or may be performed by, an image retrieval apparatus as described with reference to FIGS. 1 and 4.

For example, the query color phrase can be mapped to the corresponding color embedding using a text-to-color embedding model. In some cases, this color embedding is referred to as entity color embedding. Next, the entity color embedding is compared and matched against each color embedding of the matched objects stored in the search engine database. The entity color embedding and object embeddings that are within a threshold distance in the common color embedding space are considered matches.

At operation 215, the system performs a search on a set of images based on the color embedding space. In some cases, the operations of this step refer to, or may be performed by, an image retrieval apparatus as described with reference to FIGS. 1 and 4. During offline operation, the system obtains object color embeddings based on segmentation masks to be used in the elastic search indexing. In some cases, the each segmentation mask is associated with a label. The system compares each of a set of candidate images in the database to the search query based on the entity and the entity color embedding, where each of the candidate images is stored in the database together with candidate metadata including multiple candidate object labels and a candidate object color embedding corresponding to each of the candidate object labels.

At operation 220, the system presents one or more matching images to the user. In some cases, the operations of this step refer to, or may be performed by, an image retrieval apparatus as described with reference to FIGS. 1 and 4. The user is able to view the matching images presented. The user can choose to refine the search results by running an additional search (i.e., by entering a different search query on an image search engine).

Figure 3:
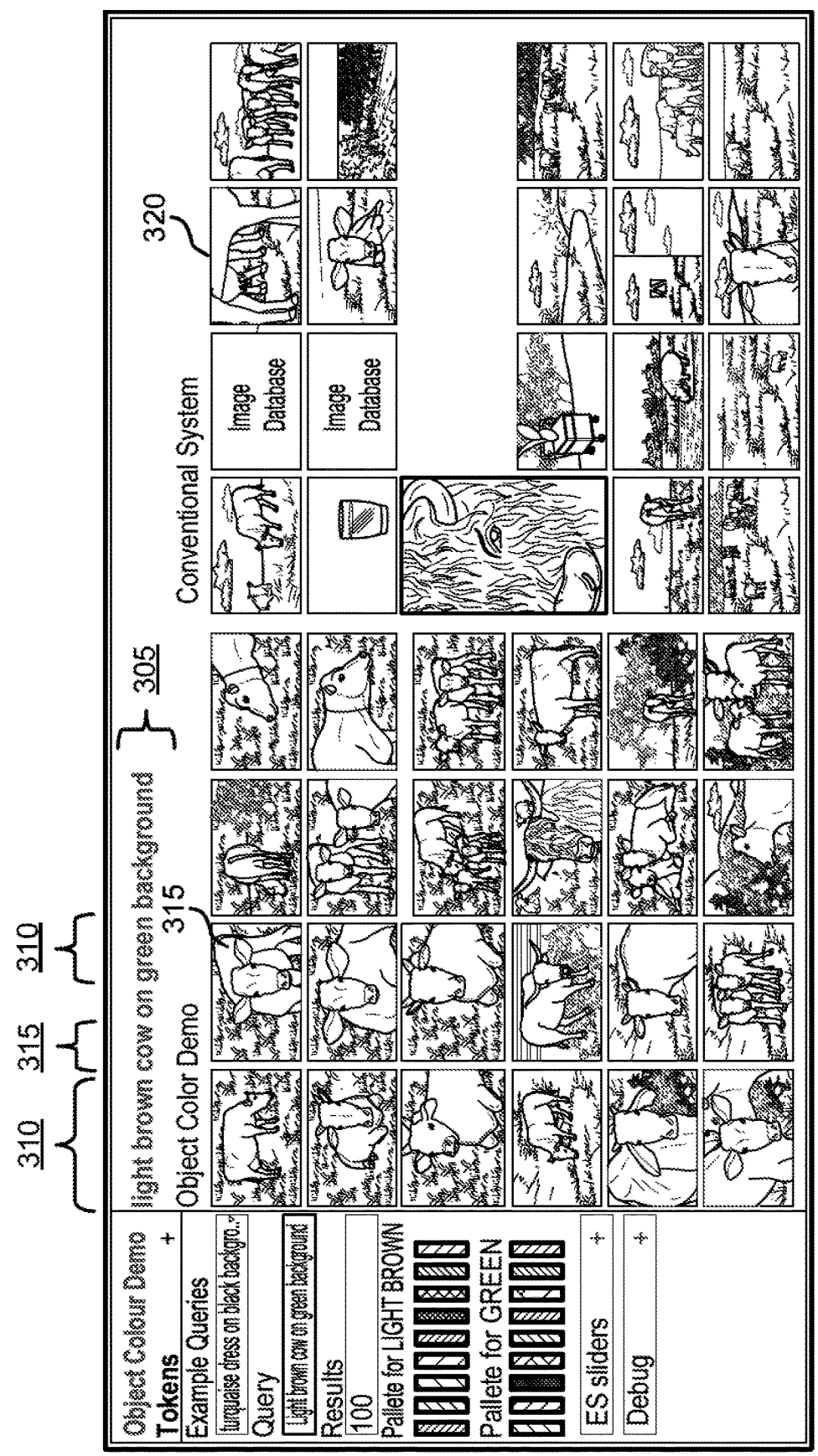
FIG. 3 shows an example of a developer user interface for an image retrieval system according to aspects of the present disclosure.

FIG. 3 shows an example of a developer user interface for an image retrieval system according to aspects of the present disclosure. A user can input a search query via the user interface and view search results. The example shown includes user interface 300, search query 305, color phrase 310, entity 315, and image 320.

According to an embodiment, user interface 300 includes a search query box where a user can type in a search query to retrieve images 320 from a database. User interface 300 is a part of an image search engine (e.g., Adobe® Stock, Google®). For example, search query 305 is "light brown cow on green background". User interface 300 is an example of, or includes aspects of, the corresponding element described with reference to FIG. 5. The search query includes entity 315 "cow" and entity 315 "background". Background is a special type of entity 315. In some cases, the term entity refers to an object (not a color phrase) from a search query.

In some examples, the image retrieval apparatus (see FIG. 1) removes or demotes the rank of irrelevant results and retrieves relevant results that would be omitted using conventional tag-matching methods. In the example illustrated in FIG. 3, conventional systems may retrieve irrelevant or inaccurate images that are not directly related to the search query "light brown cow on green background." Certain retrieved images may include exclusively cows or exclusively a background, not desired by users. According to an embodiment, the image retrieval apparatus can parse the search query to determine which object of the search query a color phrase is referring to. For example, color phrase "light brown" describes cow while color phrase "green" describes background. Therefore, ranking associated with images such as green cow on light brown background is decreased and would not be included in the search results for the search query. As a result, image search accuracy is increased.

Similarly, in some examples, red roses on a white background may be removed or reduced in ranking for a search query "white rose red background". In another example, images with salmon pink vases for the query "salmon pink vase wooden table" may be considered relevant and included in the search results even if the color of the vase was not mentioned in the image caption.

Architecture

Figure 4:
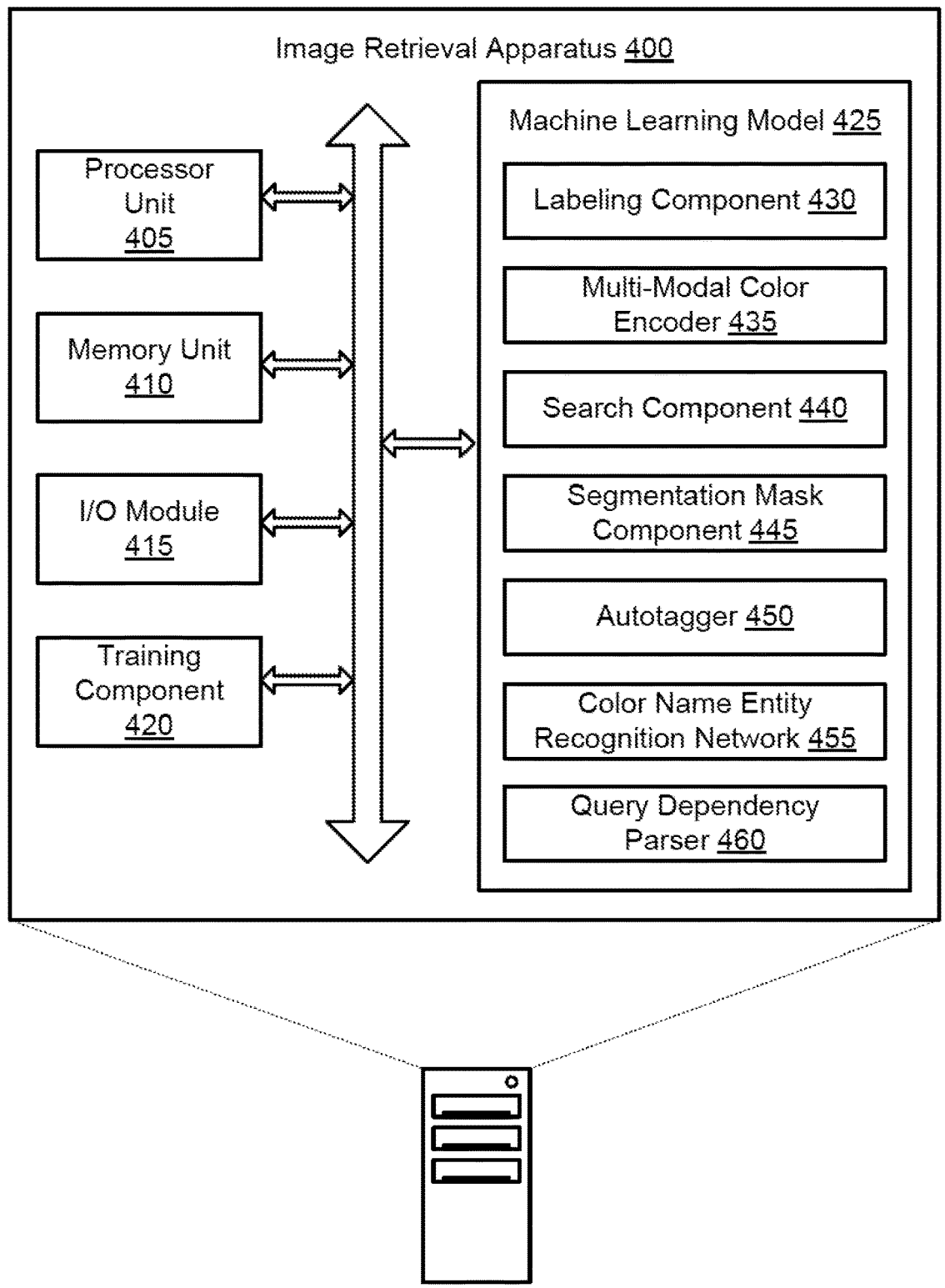
FIG. 4 shows an example of an image retrieval apparatus according to aspects of the present disclosure.
Figure 5:
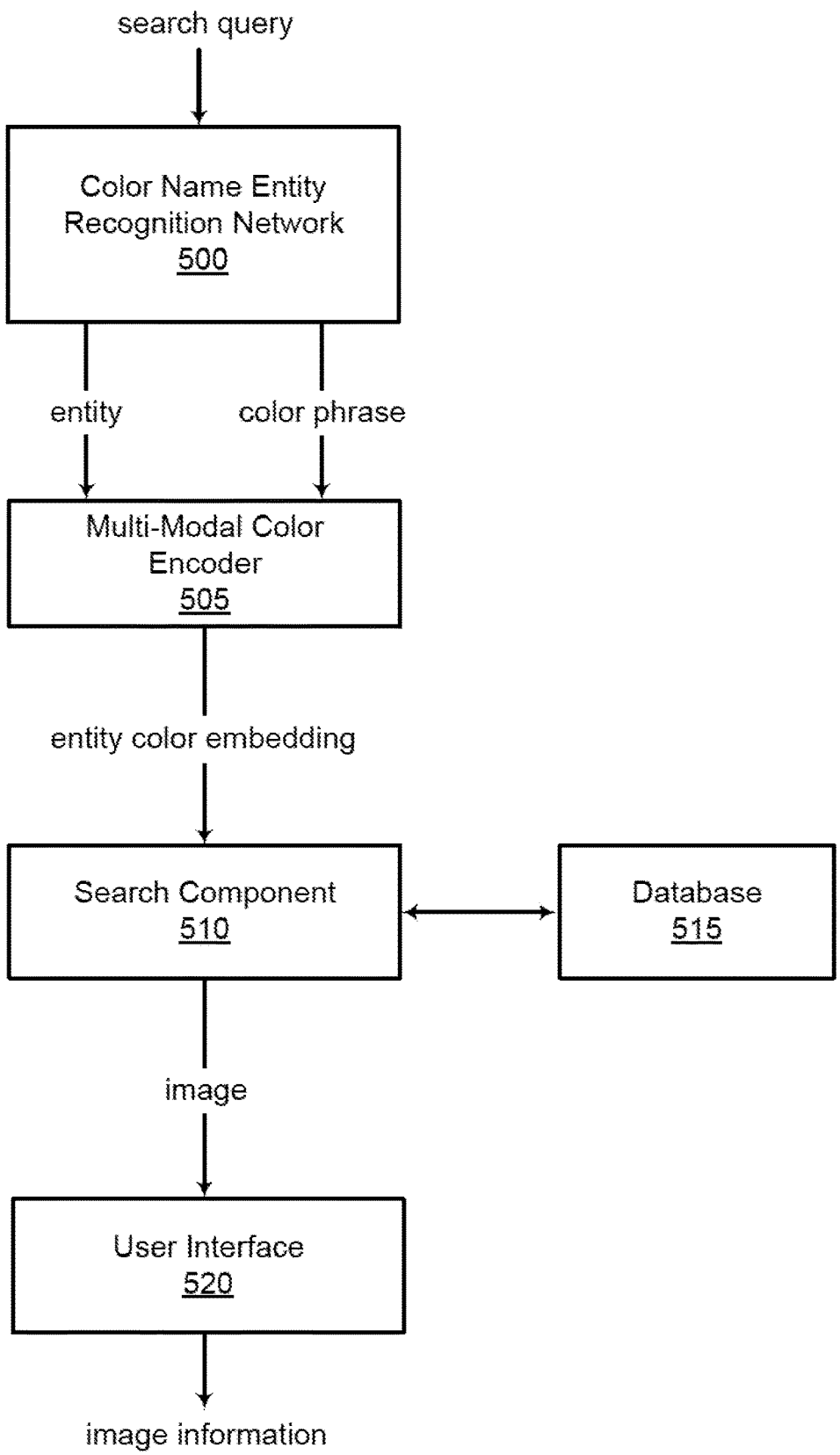
FIG. 5 shows an example of an image retrieval diagram according to aspects of the present disclosure.

In FIGS. 4-5, an apparatus and method for image retrieval are described. One or more embodiments of the apparatus and method include a labeling component configured to generate an object label for an object in an image; a multi-modal color encoder configured to generate an entity color embedding for a color phrase describing an entity in a search query, and to generate an object color embedding for the object based on an object mask; and a search component configured to match the entity in the search query to the object in the image, and to determine that the entity color embedding is similar to the object color embedding.

Some examples of the apparatus and method further include a segmentation mask component configured to generate the object mask for the object. Some examples of the apparatus and method further include a database comprising a plurality of images indexed for image search, wherein each of the plurality of images comprises image metadata including labels and color embedding information corresponding to the labels.

Some examples of the apparatus and method further include an auto-tagger configured to generate the object label for the object based on the object mask. Some examples of the apparatus and method further include a color name entity recognition (NER) network configured to process the search query to identify the color phrase describing the entity. Some examples of the apparatus and method further include a query dependency parser (QDP) configured to process the search query to determine a relationship between the entity and the color phrase.

FIG. 4 shows an example of an image retrieval apparatus according to aspects of the present disclosure. The example shown includes image retrieval apparatus 400 which further includes processor unit 405, memory unit 410, I/O module 415, training component 420, and machine learning model 425. The machine learning model 425 further includes labeling component 430, multi-modal color encoder 435, search component 440, segmentation mask component 445, auto-tagger 450, color name entity recognition network 455, and query dependency parser 460. Image retrieval apparatus 400 is an example of, or includes aspects of, the corresponding element described with reference to FIG. 1.

A processor unit 405 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 405 is configured to operate a memory array using a memory controller. In other cases, a memory controller is integrated into the processor. In some cases, the processor unit 405 is configured to execute computer-readable instructions stored in a memory to perform various functions. In some embodiments, a processor unit 405 includes special purpose components for modem processing, baseband processing, digital signal processing, or transmission processing.

Examples of a memory unit 410 include random access memory (RAM), read-only memory (ROM), or a hard disk. Examples of memory unit 410 include solid state memory and a hard disk drive. In some examples, a memory unit 410 is used to store computer-readable, computer-executable software including instructions that, when executed, cause a processor to perform various functions described herein. In some cases, the memory unit 410 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 410 store information in the form of a logical state.

I/O module 415 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an IO controller.

In some examples, I/O module 415 includes a user interface. A user interface may enable a user to interact with a device. In some embodiments, the user interface may include an audio device, such as an external speaker system, an external display device such as a display screen, or an input device (e.g., remote control device interfaced with the user interface directly or through an IO controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, the image retrieval apparatus includes a computer implemented artificial neural network (ANN) for image processing. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

In some examples, the ANN includes a convolutional neural network (CNN). A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 420 receives training data including a set of training color phrases and a corresponding set of color images. Training component 420 trains a multi-modal color encoder 435 based on the training data using contrastive learning. In some examples, training component 420 selects a negative sample color for a color phrase in the set of training color phrases, where the negative sample color has a different color than the color phrase. In some examples, training component 420 selects a positive sample color for the color phrase, where the positive sample color has a same color as the color phrase, and where the contrastive learning is based on the positive sample color and the negative sample color. According to some embodiments, labeling component 430 is configured to generate an object label for an object in an image.

According to some embodiments, multi-modal color encoder 435 generates an entity color embedding in a color embedding space from a color phrase (e.g., in a search query). In some examples, multi-modal color encoder 435 generates an additional entity color embedding for an additional color phrase describing an additional entity in the search query. In some examples, multi-modal color encoder 435 generates the object color embedding for objects in an image (e.g., based on object masks). In some examples, the multi-modal color encoder 435 is trained using a contrastive learning model. Multi-modal color encoder 435 is an example of, or includes aspects of, the corresponding element described with reference to FIG. 5.

According to some embodiments, search component 440 identifies an image in a database based on metadata for the image including an object label corresponding to the extracted entity and an object color embedding in the color embedding space corresponding to the object label. In some examples, search component 440 compares each of a set of candidate images in the database to the search query based on the entity and the entity color embedding, where each of the set of candidate images is stored in the database together with candidate metadata including multiple candidate object labels and a candidate object color embedding corresponding to each of the candidate object labels.

In some examples, search component 440 calculates a distance between the entity color embedding and the object color embedding in the color embedding space. For example, the distance could be a Euclidean distance in a vector space. Search component 440 compares the distance to a threshold value, where the image is identified based on the comparison. According to some embodiments, search component 440 determines that the entity color embedding is within a threshold distance of the object color embedding in a color embedding space. Search component 440 then selects the image based on the determination.

In some examples, search component 440 matches an additional entity in the search query to one or more additional objects in the image. Search component 440 then determines that an additional object color embedding corresponding to the additional object is within a threshold distance of the additional entity color embedding, where the image is identified based on the determination. In some examples, search component 440 identifies a set of color-object combinations that include a false color phrase with a color-like term that does not indicate a color. Search component 440 filters the false color phrase from a set of color phrases in the search query based on the set of color-object (i.e., color-entity) combinations. In some examples, search component 440 identifies a set of colors corresponding to pixels of the image located within the object mask, where the object color embedding is based on the set of colors.

According to some embodiments, search component 440 is configured to match the entity in the search query to the object in the image, and to determine that the entity color embedding is similar to the object color embedding. Search component 440 is an example of, or includes aspects of, the corresponding element described with reference to FIG. 5. According to some embodiments, auto-tagger 450 generates the object label for the object in the image based on the object mask.

According to some embodiments, segmentation mask component 445 generates an object mask for an object in the image. According to some embodiments, color name entity recognition network 455 extracts an entity and a color phrase describing the entity from the search query. In some examples, the color phrase comprises an ambiguous color term, a multi-word expression, or a combination of a base color and a color modifier.

According to some embodiments, query dependency parser 460 processes the search query to obtain the color phrase. In some examples, query dependency parser 460 is configured to process the search query to determine a relationship between the entity and the color phrase. Query dependency parser 460 is an example of, or includes aspects of, the corresponding element described with reference to FIGS. 7 and 10.

According to some embodiments, machine learning model 425 receives a search query from a user. Machine learning model 425 provides image information for the image to the user based on the metadata. Machine learning model 425 displays the image to the user based on the image information. In some cases, the term machine learning model 425 and the term image retrieval network are used interchangeably.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 5 shows an example of an image retrieval diagram according to aspects of the present disclosure. The image retrieval diagram of FIG. 5 shows the relationship between elements of the image retrieval apparatus described with reference to FIG. 4. The example shown includes color name entity recognition network 500, multi-modal color encoder 505, search component 510, database 515, and user interface 520.

According to the example illustrated in FIG. 5, a search query is input to color name entity recognition network 500. For example, the search query is "light brown cow on green background" as in FIGS. 1 and 2. According to some embodiments, color name entity recognition network 500 extracts an entity and a color phrase describing the entity from the search query. Color name entity recognition network 500 detects the presence of color terms. In the above example, color name entity recognition network 500 detects that "light brown" and "green" are color phrases in the search query. Embodiments of the present disclosure can identify and handle one or more color phrases in a search query. Color name entity recognition network 500 is an example of, or includes aspects of, the corresponding element described with reference to FIG. 10.

According to an embodiment, a trained query dependency parser is used to determine which object in an image a color phrase refers to. In some cases, the object word may be immediately to the right of the color term. In the above example, the query dependency parser identifies that color phrase "light brown" refers to cow while color phrase "green" refers to the background. This approach can be extended to other languages. For example, in some embodiments language specific models are trained for color embedding, named entity recognition, text-to-color conversion, object labeling, or any combination thereof. Additionally or alternatively, language independent or cross-lingual models can be trained.

According to an embodiment, the entity and the color phrase are input to multi-modal color encoder 505. Multi-modal color encoder 505 is an example of, or includes aspects of, the corresponding element described with reference to FIG. 4. Multi-modal color encoder 505 is configured to generate an entity color embedding for the color phrase describing an entity in a search query, and to generate an object color embedding for the object based on an object mask.

The entity color embedding depicted in FIG. 5 refers to an embedding of a color In some embodiments, an embedding for an entity and an embedding for a color corresponding to the entity are generated separately and located in different embedding spaces.

The entity color embedding for the color phrase is input to search component 510 Search component 510 is an example of, or includes aspects of, the corresponding element described with reference to FIG. 4. Search component 510 is configured to match the entity in the search query to the object in the image, and to determine that the entity color embedding is similar to the object color embedding. Search component 510 identifies an image in a database 515 based on metadata for the image including an object label corresponding to the extracted entity and an object color embedding in the color embedding space corresponding to the object label. Database 515 is an example of, or includes aspects of, the corresponding element described with reference to FIGS. 7, and 8.

Image information for the image is presented to the user based on the metadata via user interface 520. User interface 520 is an example of, or includes aspects of, the corresponding element described with reference to FIG. 3.

Image Retrieval

In FIGS. 6 to 11, a method, apparatus, and non-transitory computer readable medium for image retrieval are described. One or more embodiments of the method, apparatus, and non-transitory computer readable medium include receiving a search query from a user; extracting an entity and a color phrase describing the entity from the search query; generating an entity color embedding in a color embedding space from the color phrase using a multi-modal color encoder; identifying an image in a database based on metadata for the image including an object label corresponding to the extracted entity and an object color embedding in the color embedding space corresponding to the object label; and providing image information for the image to the user based on the metadata.

Some examples of the method, apparatus, and non-transitory computer readable medium further include processing the search query using a color name entity recognition (NER) network to obtain the entity. Some examples further include processing the search query using a query dependency parser (QDP) to obtain the color phrase.

Some examples of the method, apparatus, and non-transitory computer readable medium further include comparing each of a plurality of candidate images in the database to the search query based on the entity and the entity color embedding, wherein each of the plurality of candidate images is stored in the database together with candidate metadata including multiple candidate object labels and a candidate object color embedding corresponding to each of the candidate object labels. Some examples of the method, apparatus, and non-transitory computer readable medium further include displaying the image to the user based on the image information.

Some examples of the method, apparatus, and non-transitory computer readable medium further include calculating a distance between the entity color embedding and the object color embedding in the color embedding space. Some examples further include comparing the distance to a threshold value, wherein the image is identified based on the comparison.

Some examples of the method, apparatus, and non-transitory computer readable medium further include generating an additional entity color embedding for an additional color phrase describing an additional entity in the search query. Some examples further include matching the additional entity in the search query to an additional object in the image. Some examples further include determining that an additional object color embedding corresponding to the additional object is within a threshold distance of the additional entity color embedding, wherein the image is identified based on the determination.

In some examples, the color phrase comprises an ambiguous color term, a multi-word expression, or a combination of a base color and a color modifier. Some examples of the method, apparatus, and non-transitory computer readable medium further include identifying a set of color-object combinations that include a false color phrase with a color-like term that does not indicate a color. Some examples further include filtering the false color phrase from a set of color phrases in the search query based on the set of color-object combinations.

Some examples of the method, apparatus, and non-transitory computer readable medium further include generating an object mask for an object in the image. Some examples further include generating the object label for the object based on the object mask. Some examples further include generating the object color embedding for the object based on the object mask.

Some examples of the method, apparatus, and non-transitory computer readable medium further include identifying a plurality of colors corresponding to pixels of the image located within the object mask, wherein the object color embedding is based on the plurality of colors. In some examples, the object color embedding is generated using the multi-modal color encoder. In some examples, the multi-modal color encoder is trained using a contrastive learning model.

Figure 6:
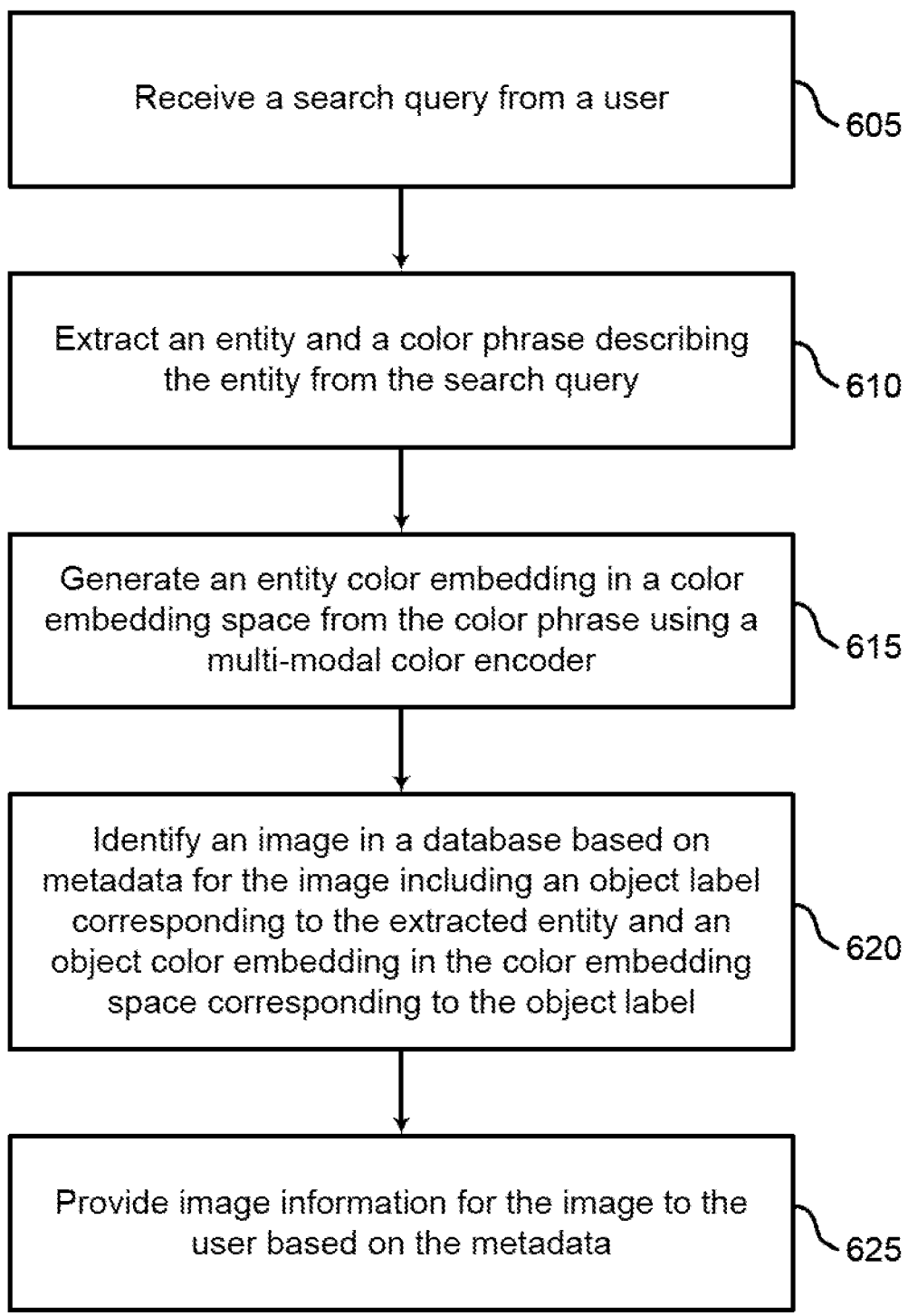
FIG. 6 shows an example of image retrieval according to aspects of the present disclosure.

FIG. 6 shows an example of image retrieval according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system receives a search query from a user. In some cases, the operations of this step refer to, or may be performed by, an image retrieval network or machine learning model as described with reference to FIG. 4.

In some examples, the user inputs a search query on an image search engine, "magenta flower on light blue background". The search query contains one or more color-object pairs. In this example, magenta is a color phrase describing flower while light blue is another color phrase describing background.

At operation 610, the system extracts an entity and a color phrase describing the entity from the search query. In some cases, the operations of this step refer to, or may be performed by, a color name entity recognition network as described with reference to FIGS. 5 and 10.

According to an embodiment, a color name entity recognition network of the image retrieval apparatus can process query understanding to detect the presence of color terms. In some cases, complex color terms (e.g., pinkish red and salmon pink) and long-tail color terms (e.g., mauve and chartreuse) can be detected by the color name entity recognition network. For example, a query is "white rose red background" that includes two color terms (i.e., white and red are color terms). The color phrase "white" describes entity "rose" while the color phrase "red" describes entity "background". At query time, a color phrase detected by the color name entity recognition network is mapped to a color embedding in a color embedding space.

At operation 615, the system generates an entity color embedding in a color embedding space from the color phrase using a multi-modal color encoder. In some cases, the operations of this step refer to, or may be performed by, a multi-modal color encoder as described with reference to FIGS. 4 and 5.

According to an embodiment, a multi-lingual text encoder (or text-to-color encoder) is configured to convert text into a color embedding. In some cases, a multi-lingual text encoder may also be referred to as a multi-modal color encoder. A multi-lingual text encoder enables queries in different languages. In some cases, a single text encoder can encode words from more than one language. Furthermore, while the examples described in the present disclosure are provided in English, Embodiments of the disclosure are not limited to a single language.

The multi-modal color encoder converts color text to the corresponding color embedding which is in the same space as the pixel color embeddings. In some examples, a dataset includes color texts and the corresponding RGB values which are converted to color embeddings using the color pixel encoder. The color text is first converted to the associated cross-lingual sentence embedding using cross-lingual sentence models (e.g., multi-lingual universal sentence encoder (USE)). Next, the cross-lingual sentence embedding is passed to blocks of fully connected activation and regularization functions (e.g., ReLu and L2 norm layers). L2 norm layers can restrict the values to be in the range of 0 to 1. The network model uses the cross-lingual multi-modal text to color embedding model. Other cross-lingual multi-modal text to color embedding model may also be used herein.

At operation 620, the system identifies an image in a database based on metadata for the image including an object label corresponding to the extracted entity and an object color embedding in the color embedding space corresponding to the object label. In some cases, the operations of this step refer to, or may be performed by, a search component as described with reference to FIGS. 4 and 5.

According to an embodiment of the present disclosure, the color-object pairs from the search query are encoded and stored as color embedding associated with an object mask and the textual tag for the object mask. Additionally, the image background is considered a type of object and associated with a separate color embedding, for example, to be matched with queries such as "blue present on pink background". At query time, a color name entity recognition network detects color phrases where each of the color phrases is mapped to a corresponding color embedding in a color embedding space. Next, the object keyword in the search query is matched to an object textual tag in the image using standard text matching methods and the color embedding for the object is matched to the query color embedding.

At operation 625, the system provides image information for the image to the user based on the metadata. In some cases, the operations of this step refer to, or may be performed by, an image retrieval network or a machine learning model as described with reference to FIG. 4. The user can modify the search query or input a different search query on the image search engine.

Figure 7:
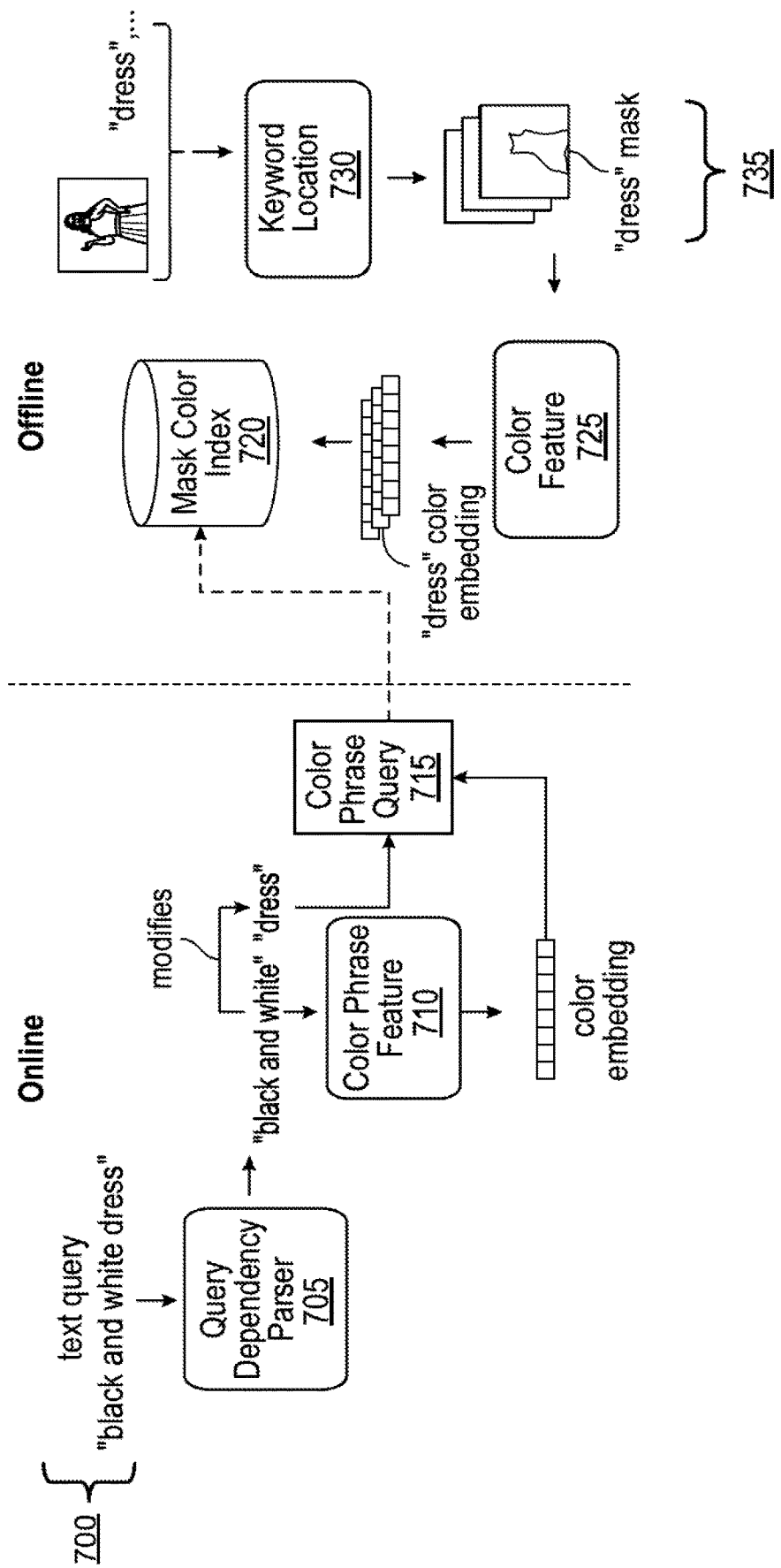
FIG. 7 shows an example of identifying an image in a database according to aspects of the present disclosure.

FIG. 7 shows an example of identifying an image in a database according to aspects of the present disclosure. The image retrieval apparatus in FIG. 4 is trained to perform image search and retrieval. Note there are two stages including online (query stage) and offline. The example shown includes search query 700, query dependency parser 705, color feature phrase 710, color phrase query 715, database 720, color feature 725, keyword location 730, and object mask 735.

The search query 700 can be input to the query dependency parser 705, which identifies which color modifiers correspond to objects in the query, and generates color phrase feature 710. The color phrase feature 710 can be embedded in a color embedding space to generate the color phrase query 715. The color phrase query 715 can be compared against images in the database 720 storing mask color index based on a set of candidate images. Database 720 includes images having metadata that includes objects associated with color features 725. For example, masks for objects in an image can be generated based on a neural network that identifies a keyword location 730, and then object masks 735 for the key words. Color embeddings for specific objects can then be generated based on the object masks.

Embodiments of the present disclosure include an image retrieval apparatus which connects different components to increase accuracy of color-based image search. The image retrieval apparatus (see FIG. 4) recognizes color-object pairs from queries and assets by matching color-object pairs with assets which contain the corresponding content. As embedding-based method, the color-object pairs are stored as a color embedding associated with an object mask and the textual tag for the object mask. Additionally, the image background is considered a type of object and associated with a color embedding, for example, to match queries like "blue present on pink background". At query time, a color NER (name entity recognizer)-detected color is mapped to a color embedding. Next, the object keyword in the query is matched to an object textual tag in the image using standard text matching methods and the color embedding for the object is matched to the query color embedding.

In some embodiments of the present disclosure, a pipeline network architecture is used to achieve accurate color object retrieval. The image retrieval apparatus includes image understanding, query understanding, multi-modal bridge, and search matching and ranking.

Search query 700 is an example of, or includes aspects of, the corresponding element described with reference to FIGS. 3 and 10. Query dependency parser 705 is an example of, or includes aspects of, the corresponding element described with reference to FIGS. 4 and 10. Database 720 is an example of, or includes aspects of, the corresponding element described with reference to FIGS. 1, 5, and 8. Object mask 735 is an example of, or includes aspects of, the corresponding element described with reference to FIG. 8.

Figure 8:
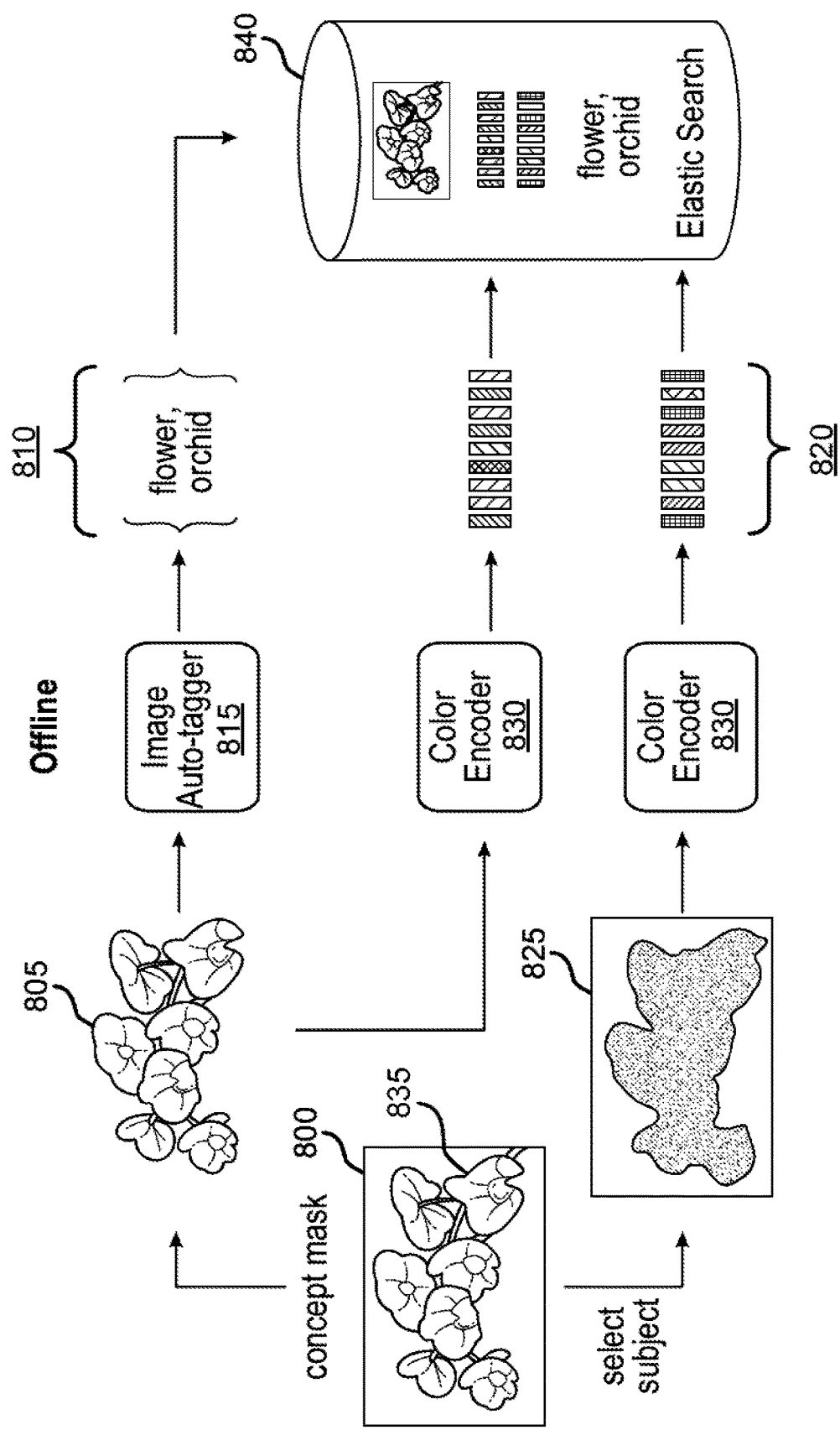
FIG. 8 shows an example of generating an object color embedding according to aspects of the present disclosure.

FIG. 8 shows an example of generating an object color embedding according to aspects of the present disclosure. The process of generating object color embedding corresponding to object labels of a set of candidate images refers to offline stage in FIG. 7. The example shown includes image 800, object mask 805, object label 810, image auto-tagger 815, color embedding 820, background mask 825, color encoder 830, object 835, and database 840.

One or more embodiments of the present disclosure use data that includes images and corresponding metadata associated with each of the images. In some cases, metadata is a set of keywords associated with each image. These keywords are provided by a contributor who uploads the image to an image website or a graphics website. Alternatively, keywords are produced by image tagger models which recommend keywords when an image is uploaded to a database or website.

In some examples, the network model extracts one or more masks (e.g., object mask 805). For each of keyword corresponding to the image 800, the network model extracts a segmentation mask corresponding to the tag in the image.

Given an image 800 and a keyword, the network model returns a segmentation mask which corresponds to the keyword. Additionally, the network model produces object masks 805 for categories that are not seen during training.

According to some embodiments, an object mask 805 is produced by a concept mask module to reduce noise of the masks while the image auto-tagger 815 generates tags. Each tag produced by the image auto-tagger 815 includes a corresponding confidence score associated to it. The confidence score indicates the degree of relevance of a tag for the mask. For a lower limit on confidence value, if a keyword for which the mask is produced is part of the tags produced by the image auto-tagger 815, then the network model is configured to index the color embeddings for the mask. If a keyword is not part of the tags produced by the image auto-tagger 815, the network model considers the mask produced as noisy and the mask is therefore discarded. The confidence threshold has an impact on the quality of masks that are indexed for retrieval. If the confidence threshold is set to be strict (i.e., close to 1), the network model may end up with relatively few masks that can be indexed. Alternatively, if the threshold is set to be lenient (i.e., close to 0), the network model generates masks that are very noisy, and the quality of results is decreased at image retrieval. In some examples, 0.75 may be used as confidence threshold.

According to some embodiments of the present disclosure, color encoder 830 converts the RGB space of a mask to LAB space to compute the color embeddings of each object mask 805 and background mask 825. LAB space is used because if two color vectors in the RGB space are close to each other (using L2 distance), they are not perceptually close with respect to human color vision. LAB space is perceived as uniform with respect to human color vision, i.e., a numerical change in the LAB values correspond to approximately the same amount of visually perceived change. Therefore, 3D histograms are used in LAB space. The network model locates appropriate intervals to compute histograms by evaluating which interval combinations are better for color similarity search.

For example, the combination of histograms of sizes [9, 7, 8] and [10, 10, 10] have been shown to produce accurate performance in testing. Two histograms are calculated using [9, 7, 8] and [10, 10, 10] intervals and concatenated to get one feature vector. Next, the square root of each number in the feature vector is calculated to obtain the final color embedding. Taking the square root penalizes the dominant color and gives other colors in the image more weights. According to an embodiment, color encoder 830 of the network model converts RGB values to the corresponding 1504-dimension color embeddings by taking each RGB value individually to obtain two non-zero values in the feature vector, i.e., only one value in color histograms of sizes 504 and 1000 is left non-zero. Embodiments of the present disclosure are not limited to this style of color embedding and can be adapted to other types of color embeddings. The color embeddings 820 using the masks are indexed in the elastic search pipeline as elastic search features for object tags and as another feature for the background masks 825. Object mask 805 is an example of, or includes aspects of, the corresponding element described with reference to FIG. 7. Database 840 is an example of, or includes aspects of, the corresponding element described with reference to FIGS. 5 and 7.

Figure 9:
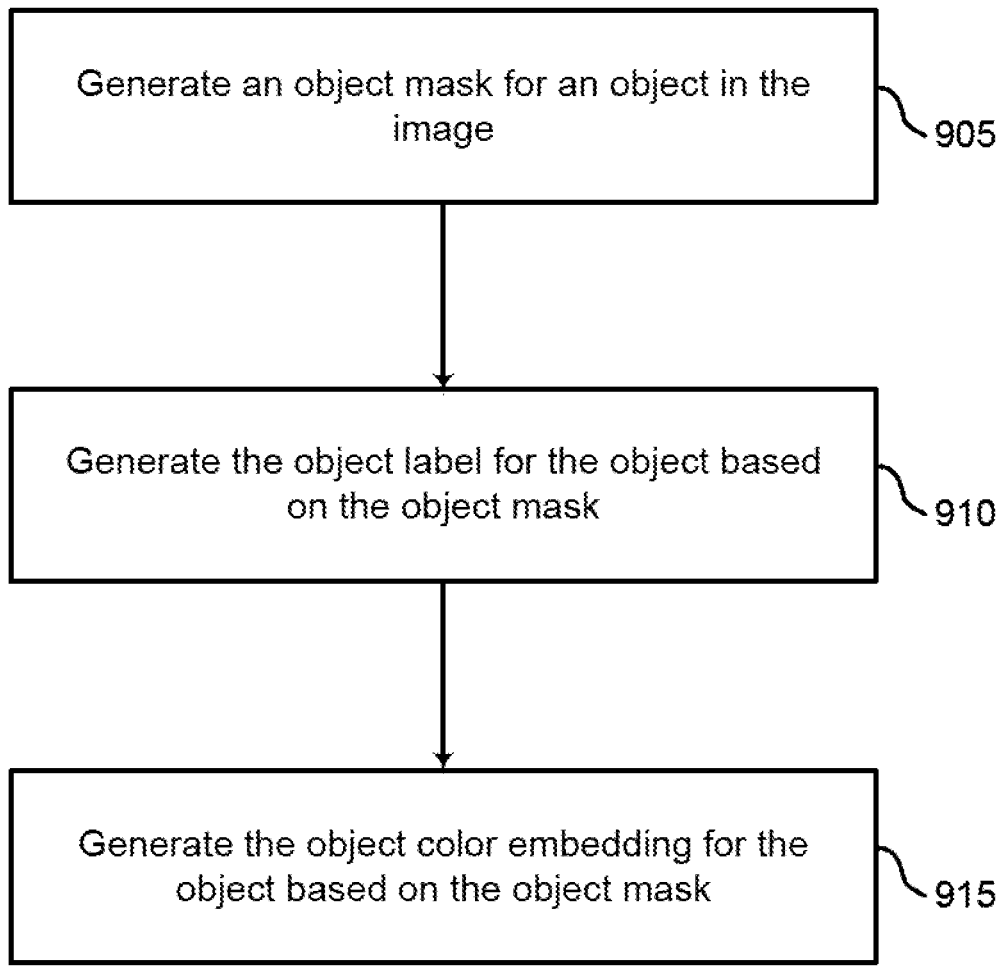
FIG. 9 shows an example of generating an object color embedding according to aspects of the present disclosure.

FIG. 9 shows an example of generating an object color embedding according to aspects of the present disclosure. The process of generating object color embedding corresponding to object labels of a set of candidate images refers to offline stage in FIG. 7. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system generates an object mask for an object in the image. In some cases, the operations of this step refer to, or may be performed by, a segmentation mask component as described with reference to FIG. 4. In some embodiments, the image retrieval apparatus (see FIG. 4) processes non-background objects dependent on a rich-tagged concept mask dataset and color embeddings for object and background masks.

According to an embodiment, objects of an image are determined using a keyword location mask (e.g., Adobe® Stock keyword location masks). However, standard object detection and masking methods may be applied herein. A segmentation mask component of the image retrieval apparatus generates an object mask for an object in the image. The object mask for the object is then input to an image auto-tagger.

At operation 910, the system generates the object label for the object based on the object mask. In some cases, the operations of this step refer to, or may be performed by, an auto-tagger as described with reference to FIG. 4.

According to an embodiment, an auto-tagger of the image retrieval apparatus generates the object label for the object based on the object mask. A high confidence identification of the object is indicated and transmitted to the system if the label from a keyword location mask matches the label from the image auto-tagger. The object mask is kept as the object (or the object mask is associated with the object). The object mask is assigned textual label that the keyword location and auto-tagger model agree on (i.e., label is a match).

At operation 915, the system generates the object color embedding for the object based on the object mask. In some cases, the operations of this step refer to, or may be performed by, a multi-modal color encoder as described with reference to FIGS. 4 and 5.

Additionally, for each of the labeled keyword location masks, the network model converts text to a color embedding (i.e., using a text-to-color model) and stores the embedding with the mask and the associated textual object tag in the index. Unlike metadata-based method, neither the name of the object nor the name of the color phrase appears in the contributor-provided captions or tags. According to an embodiment, regarding the object name, confidence is determined based on the overlap of keyword location and auto-tagger labels. Similarly, as for color names, no textual name (e.g., "red", "blue") is created because the color phrase is encoded as color embedding in a color embedding space.

Figure 10:
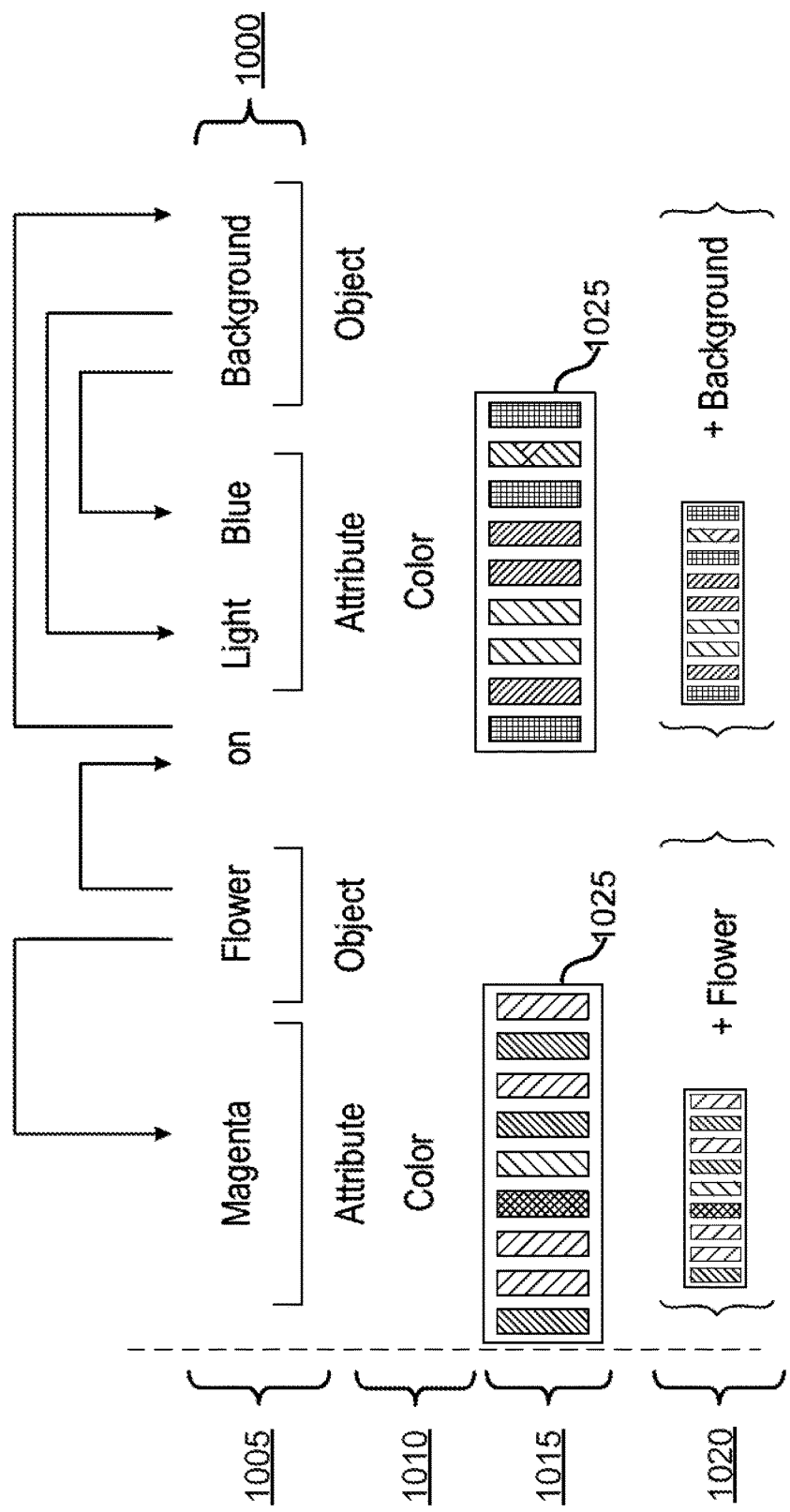
FIG. 10 shows an example of generating an entity color embedding based on a search query according to aspects of the present disclosure.

FIG. 10 shows an example of a process for generating an entity color embedding based on a search query according to aspects of the present disclosure. The process for generating an entity color embedding based on a color phrase of a search query refers to the online (query) stage. The example shown includes search query 1000, query dependency parser 1005, color name entity recognition network 1010, text to color model 1015, and query 1020.

As an example illustrated in FIG. 10, search query 1000 is "magenta flower on light blue ground". Search query 1000 is an example of, or includes aspects of, the corresponding element described with reference to FIGS. 3 and 7.

According to some embodiments of the present disclosure, the image retrieval apparatus can process query understanding using a customized NER model to detect the presence of color terms. In some examples, color name entity recognition network 1010 is used to detect complex color terms (e.g., pinkish red and salmon pink) and long-tail color terms (e.g., mauve and chartreuse). For example, a search query from a user is "white rose red background" that includes two color terms (i.e., "white" and "red"). Another query (i.e., snow white) has no color terms because "white" is part of the character name, i.e., "Snow White". Similarly, a query may be snowy field that contains no color terms. In the example illustrated in FIG. 10, color name entity recognition network 1010 can detect color terms to be "magenta" and "light blue".

According to an embodiment, a trained query dependency parser 1005 is used to determine which object a color word/phrase is referring to. In the example illustrated in FIG. 10, query dependency parser 1005 can identify that "magenta" is a color attribute associated with object "flower". In addition, query dependency parser 1005 can identify "light blue" is a color attribute associated with object "background". Query dependency parser 1005 is an example of, or includes aspects of, the corresponding element described with reference to FIGS. 4 and 7. Color name entity recognition network 1010 is an example of, or includes aspects of, the corresponding element described with reference to FIG. 5.

In some cases, an object term may be immediately to the right of the color term. For example, a query may be "white rose red background", where the rose is white, and the background is red. In some cases, an object term may be further away or may be a multi-word expression (e.g., "blue plaid skirt", "pink jeans jacket", or "red coffee cup"). Alternatively, a query may be polka dots red, where the object term may be to the left of the color term. The object is represented as text (e.g., rose, skirt, polka dots) while the color is represented by color embedding (e.g., text-to-color embedding using a text to color model 1015). In some examples, query 1020 herein is defined as a combination of color embedding representing a color term and text representing an object term.

Figure 11:
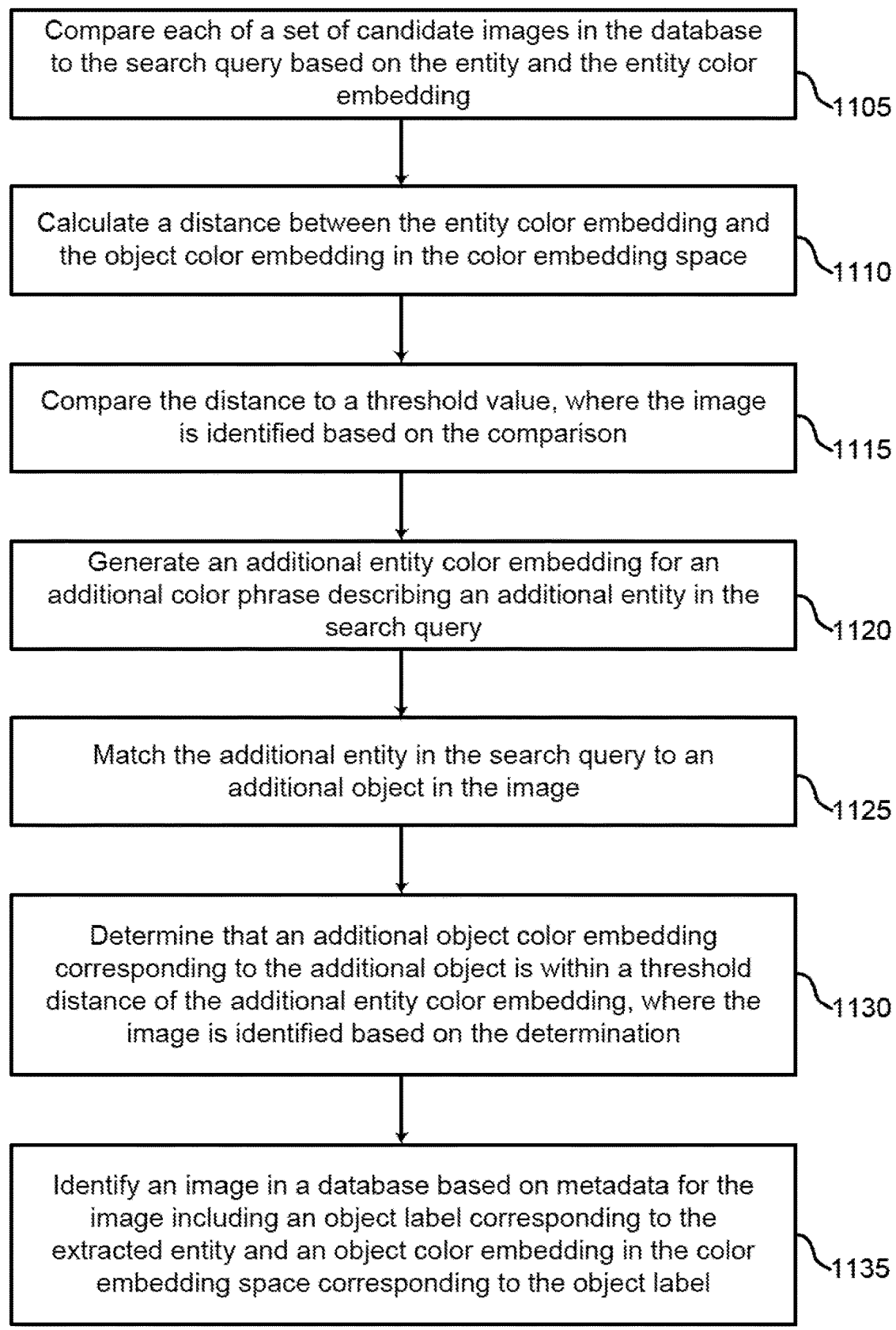
FIG. 11 shows an example of performing a search according to aspects of the present disclosure.

FIG. 11 shows an example of performing a search according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system compares each of a set of candidate images in the database to the search query based on the entity and the entity color embedding, where each of the set of candidate images is stored in the database together with candidate metadata including multiple candidate object labels and a candidate object color embedding corresponding to each of the candidate object labels. In some cases, the operations of this step refer to, or may be performed by, a search component as described with reference to FIGS. 4 and 5.

In some examples, index-side and query-side color-object information is used in searching for high-relevance images when a search query includes one or more color-object pairs (e.g., a color phrase describing an entity). The image retrieval network removes or demotes the ranking of irrelevant results and returns relevant results.

At operation 1110, the system calculates a distance between the entity color embedding and the object color embedding in the color embedding space. In some cases, the operations of this step refer to, or may be performed by, a search component as described with reference to FIGS. 4 and 5.

At operation 1115, the system compares the distance to a threshold value, where the image is identified based on the comparison. In some cases, the operations of this step refer to, or may be performed by, a search component as described with reference to FIGS. 4 and 5.

According to an embodiment, a color name entity recognition (NER) network is configured to process the search query to identify the color phrase describing the entity in the query. An object keyword of the search query is compared to and matched against object keywords of the candidate images stored in a database (e.g., image assets). The keywords are matched using text matching methods, for example, lowercasing and lemmatization, mapping to semantic pivots or concepts, mapping into a textual embedding space, etc.

The query color phrase is mapped to a corresponding entity color embedding using text-to-color embedding model. Next, the entity color embedding is matched against object color embedding of the objects in each of the candidate image. Color embeddings that are within a certain distance of each other are considered matches. Note the color phrase in the search query is not matched as a textual string against the caption, title, or other textual data associated with candidate images. The candidate images that match in color are ranked higher than candidate images that do not match in color. Similarly, a candidate image whose color is different from the color phrase in the search query can be removed from the search results.

At operation 1120, the system generates an additional entity color embedding for an additional color phrase describing an additional entity in the search query. In some cases, the operations of this step refer to, or may be performed by, a multi-modal color encoder as described with reference to FIG. 4. As the example in FIG. 10, search query is "magenta flower on light blue ground". There are two color phrases ("magenta" and "light blue") and each color phrase describes a different entity in the search query. The multi-modal color encoder generates an entity color embedding for each color phrase.

At operation 1125, the system matches the additional entity in the search query to an additional object in the image. In some cases, the operations of this step refer to, or may be performed by, a search component as described with reference to FIGS. 4 and 5.

At operation 1130, the system determines that an additional object color embedding corresponding to the additional object is within a threshold distance of the additional entity color embedding, where the image is identified based on the determination. In some cases, the operations of this step refer to, or may be performed by, a search component as described with reference to FIGS. 4 and 5.

At operation 1135, the system identifies an image in a database based on metadata for the image including an object label corresponding to the extracted entity and an object color embedding in the color embedding space corresponding to the object label. In some cases, the operations of this step refer to, or may be performed by, a search component as described with reference to FIGS. 4 and 5.

Training and Evaluation

Figure 12:
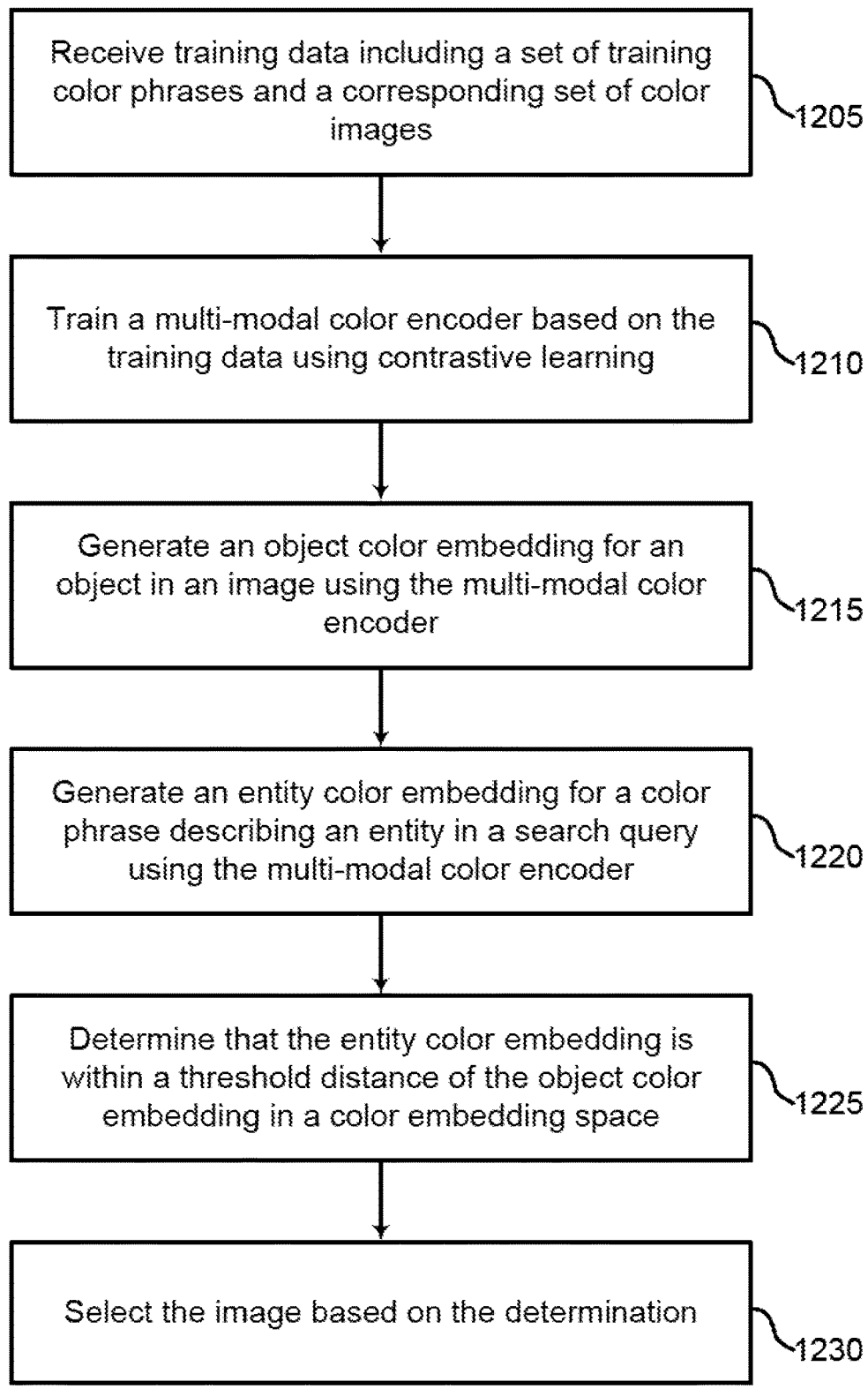
FIG. 12 shows an example of training a neural network for image retrieval according to aspects of the present disclosure.

In FIG. 12, a method, apparatus, and non-transitory computer readable medium for training a neural network are described. One or more embodiments of the method, apparatus, and non-transitory computer readable medium include receiving training data comprising a set of training color phrases and a corresponding set of color images; training a multi-modal color encoder based on the training data using contrastive learning; generating an object color embedding for an object in an image using the multi-modal color encoder; generating an entity color embedding for a color phrase describing an entity in a search query using the multi-modal color encoder; determining that the entity color embedding is within a threshold distance of the object color embedding in a color embedding space; and selecting the image based on the determination.

Some examples of the method, apparatus, and non-transitory computer readable medium further include selecting a negative sample color for a color phrase in the set of training color phrases, wherein the negative sample color has a different color than the color phrase. Some examples further include selecting a positive sample color for the color phrase, wherein the positive sample color has a same color as the color phrase, and wherein the contrastive learning is based on the positive sample color and the negative sample color.

FIG. 12 shows an example of training a neural network for image retrieval according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Accordingly, during the training process, the parameters and weights of an image retrieval network are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 1205, the system receives training data including a set of training color phrases and a corresponding set of color images. In some cases, the operations of this step refer to, or may be performed by, a training component as described with reference to FIG. 4.

In some examples, training color phrases include "wine red" and/or "salmon pink". Conventional systems confuse words such as "wine" and "salmon" in a search context as object names instead of color phrases. But "salmon pink" is a color phrase in a search query "salmon pink dress" where "salmon pink" describes the entity dress. The system is trained to detect color phrases that would otherwise be regarded as objects.

At operation 1210, the system trains a multi-modal color encoder based on the training data using contrastive learning. In some cases, the operations of this step refer to, or may be performed by, a training component as described with reference to FIG. 4.

According to an embodiment, the training component is configured to select a negative sample color for a color phrase in the set of training color phrases, where the negative sample color has a different color than the color phrase. Additionally, the training component is configured to select a positive sample color for the color phrase, where the positive sample color has a same color as the color phrase, and where the contrastive learning is based on the positive sample color and the negative sample color.

In some examples, negative samples for each of the samples in the minibatch are collected using negative mining method. The negative mining method involves finding the sample in the mini batch which has a color embedding closest to the color embedding of the sample for which the network model locates the negative sample. Additionally, the color text of both the samples are not exactly same. Accordingly, hard negative samples are obtained. Next, a metric learning loss (i.e., similar to triplet loss) is used to obtain the generated color embedding close to the corresponding positive color embedding and push the generated color embedding away from the negative color embedding.

At operation 1215, the system generates an object color embedding for an object in an image using the multi-modal color encoder. In some cases, the operations of this step refer to, or may be performed by, a multi-modal color encoder as described with reference to FIGS. 4 and 5.

According to an embodiment, a multi-modal color encoder is configured to convert text into a color embedding. The multi-modal color encoder converts color phrase (i.e., text) to a corresponding color embedding which is in the same color embedding space as the object color embeddings. In some examples, a training dataset includes color texts and the corresponding RGB values which are converted to color embeddings using the color pixel encoder.

In some examples, the color text is first converted to an associated cross-lingual sentence embedding using cross-lingual sentence models (e.g., multi-lingual universal sentence encoder). The cross-lingual sentence embedding is passed to one or more blocks of fully connected activation and regularization functions (e.g., ReLu and L2 norm layers). L2 norm layers can restrict the values to be in the range of 0-1.

At operation 1220, the system generates an entity color embedding for a color phrase describing an entity in a search query using the multi-modal color encoder. In some cases, the operations of this step refer to, or may be performed by, a multi-modal color encoder as described with reference to FIGS. 4 and 5.

According to an embodiment, the training component trains the color name entity recognition network on search queries. In some cases, an entity tagging model is trained using the xkcd color data and searching for queries which contain these color data with an object modification. This forms the dataset for training color name entity recognition network on search queries. In some cases, active learning is used to correct the model and re-training is performed in an iterative process.

At operation 1225, the system determines that the entity color embedding is within a threshold distance of the object color embedding in a color embedding space. In some cases, the operations of this step refer to, or may be performed by, a search component as described with reference to FIGS. 4 and 5.

The query color phrase is mapped to the corresponding color embedding using text-to-color embedding. Next, the query color embedding is compared to and matched against the color embedding of the candidate image objects (or image assets). The system determines a match when an entity color embedding is within a threshold distance of the object color embedding. Note the color phrase of a search query is not matched as a textual string against the caption, title, auto-tags, and other textual data associated with a candidate image. The candidate images which match in color are ranked higher than images which do not match in color Similarly, an image whose color is different from the query color phrase can be removed from the search results.

At operation 1230, the system selects the image based on the determination. In some cases, the operations of this step refer to, or may be performed by, a search component as described with reference to FIGS. 4 and 5. The search component displays the selected image to the user.

Performance of apparatus, systems and methods of the present disclosure have been evaluated, and results indicate embodiments of the present disclosure have obtained increased performance over existing technology. Example experiments demonstrate that the image retrieval network outperforms conventional systems.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image retrieval, comprising:
receiving a search query from a user;
extracting an entity and a color phrase describing the entity from the search query;
generating an entity color embedding in a color embedding space using a multi-modal color encoder based on the color phrase;
identifying an image in a database based on metadata for the image, wherein the metadata includes a plurality of object labels and a plurality of object color embeddings corresponding to the plurality of object labels, respectively, and wherein the image is identified based on a match between an object label of the plurality of object labels and the extracted entity and a similarity between the entity color embedding and an object color embedding of the plurality of object color embeddings corresponding to the object label; and
providing image information for the image to the user based on the metadata.

2. The method of claim 1, further comprising:
processing the search query using a color name entity recognition (NER) network to identify the color phrase; and
processing the search query using a query dependency parser (QDP) to identify the entity modified by the color phrase.

3. The method of claim 1, further comprising:
comparing each of a plurality of candidate images in the database to the search query based on the entity and the entity color embedding, wherein each of the plurality of candidate images is stored in the database together with candidate metadata including multiple candidate object labels and a candidate object color embedding corresponding to each of the multiple candidate object labels.

4. The method of claim 1, further comprising:
displaying the image to the user based on the image information.

5. The method of claim 1, further comprising:
calculating a distance between the entity color embedding and the object color embedding in the color embedding space; and
comparing the distance to a threshold value, wherein the image is identified based on the comparison.

6. The method of claim 1, further comprising:
generating an additional entity color embedding for an additional color phrase describing an additional entity in the search query;
matching the additional entity in the search query to an additional object in the image; and
determining that an additional object color embedding corresponding to the additional object is within a threshold distance of the additional entity color embedding, wherein the image is identified based on the determination.

7. The method of claim 1, wherein:
the color phrase comprises an ambiguous color term, a multi-word expression, or a combination of a base color and a color modifier.

8. The method of claim 1, further comprising:
identifying a set of color-entity combinations that include a false color phrase with a color-like term that does not indicate a color; and
filtering the false color phrase from a set of color phrases in the search query based on the set of color-entity combinations.

9. The method of claim 1, further comprising:
generating an object mask for an object in the image;
generating the object label for the object based on the object mask; and
generating the object color embedding for the object based on the object mask.

10. The method of claim 9, further comprising:
identifying a plurality of colors corresponding to pixels of the image located within the object mask, wherein the object color embedding is based on the plurality of colors.

11. The method of claim 1, wherein:
the object color embedding is generated using the multi-modal color encoder.

12. The method of claim 1, wherein:

the multi-modal color encoder is trained using a contrastive learning model.

13. A method for training a neural network, comprising:

receiving training data comprising a set of training color phrases and a corresponding set of color images;

training a multi-modal color encoder based on the training data using contrastive learning;

generating an object color embedding for an object in an image using the multi-modal color encoder;

extracting an entity and a color phrase describing the entity in a search query;

generating an entity color embedding for the color phrase using the multi-modal color encoder; and identifying the image based on metadata for the image, wherein the metadata includes a plurality of object labels and a plurality of object color embeddings corresponding to the plurality of object labels, respectively, and wherein the image is identified based on a match between an object label of the plurality of object labels and the extracted entity and a similarity between the entity color embedding and the object color embedding of the plurality of object color embeddings corresponding to the object label.

14. The method of claim 13, further comprising:

selecting a negative sample color for a color phrase in the set of training color phrases, wherein the negative sample color has a different color than the color phrase; and selecting a positive sample color for the color phrase, wherein the positive sample color has a same color as the color phrase, and wherein the contrastive learning is based on the positive sample color and the negative sample color.

15. An apparatus for image retrieval, comprising:

a labeling component configured to generate an object label for an object in an image;

a multi-modal color encoder configured to generate an entity color embedding for a color phrase describing an entity in a search query, and to generate an object color embedding for the object based on an object mask; and a search component configured to identify the image in a database based on metadata for the image, wherein the metadata includes a plurality of object labels and a plurality of object color embeddings corresponding to the plurality of object labels, respectively, and wherein the image is identified based on a match between the object label of the plurality of object labels and the entity in the search query and a similarity between the entity color embedding and the object color embedding of the plurality of object color embeddings corresponding to the object label.

16. The apparatus of claim 15, further comprising:

a segmentation mask component configured to generate the object mask for the object.

17. The apparatus of claim 15, wherein:

the database includes a plurality of images indexed for image search, and wherein each of the plurality of images comprises image metadata including labels and color embedding information corresponding to the labels.

18. The apparatus of claim 15, further comprising:

an auto-tagger configured to generate the object label for the object based on the object mask.

19. The apparatus of claim 15, further comprising:

a color name entity recognition (NER) network configured to process the search query to identify the color phrase describing the entity.

20. The apparatus of claim 15, further comprising:

a query dependency parser (QDP) configured to process the search query to determine a relationship between the entity and the color phrase.

\* \* \* \* \*